Patented July 5, 1938

2,123,020

UNITED STATES PATENT OFFICE 2,123,020

VALVE

Harry A. Phillips, Chicago, Ill.

Application January 25, 1935, Serial No. 3,494

1 Claim. (Cl. 137—69)

This invention relates to refrigeration apparatus and more particularly to an improved float valve mechanism to control the entry of liquid refrigerant into a refrigerating unit.

The purpose of this invention is to provide a valve structure which embodies features of prime importance and great convenience in the satisfactory operation of a "flooded refrigerating system".

A principal object of this invention is to provide a device which will control within close limits, the height of liquid refrigerant in the evaporator at any desired point and which allows the replacement of the essential valve parts without a complete pumpdown of the refrigerant in the evaporator or in the float chamber, and without disconnecting the feed or suction lines.

A particular object of this invention is to change the point of application of the force from a float valve spring, to vary the balancing pressure on the float when the float arm is in different angular positions.

A further object of this invention is to utilize a cam action to increase the range of a float valve spring and thereby combine the desired sensitivity with the requisite strength for the spring.

Another object of this invention is the provision of means to utilize the pressure of the refrigerant itself as a force applying against the float arm to assist the float valve spring.

A still further object of this invention is the arrangement of the float whereby the torque is reduced when the float is unsupported by liquid.

To these and other ends the characteristic features and advantages of my improvements will more fully appear from the following description and the accompanying drawings in illustration thereof.

In the drawings, in which like reference numerals designate like parts,

Fig. 5 is an exterior view of the valve, facing the plane L—M of Fig. 1.

Figure 1:
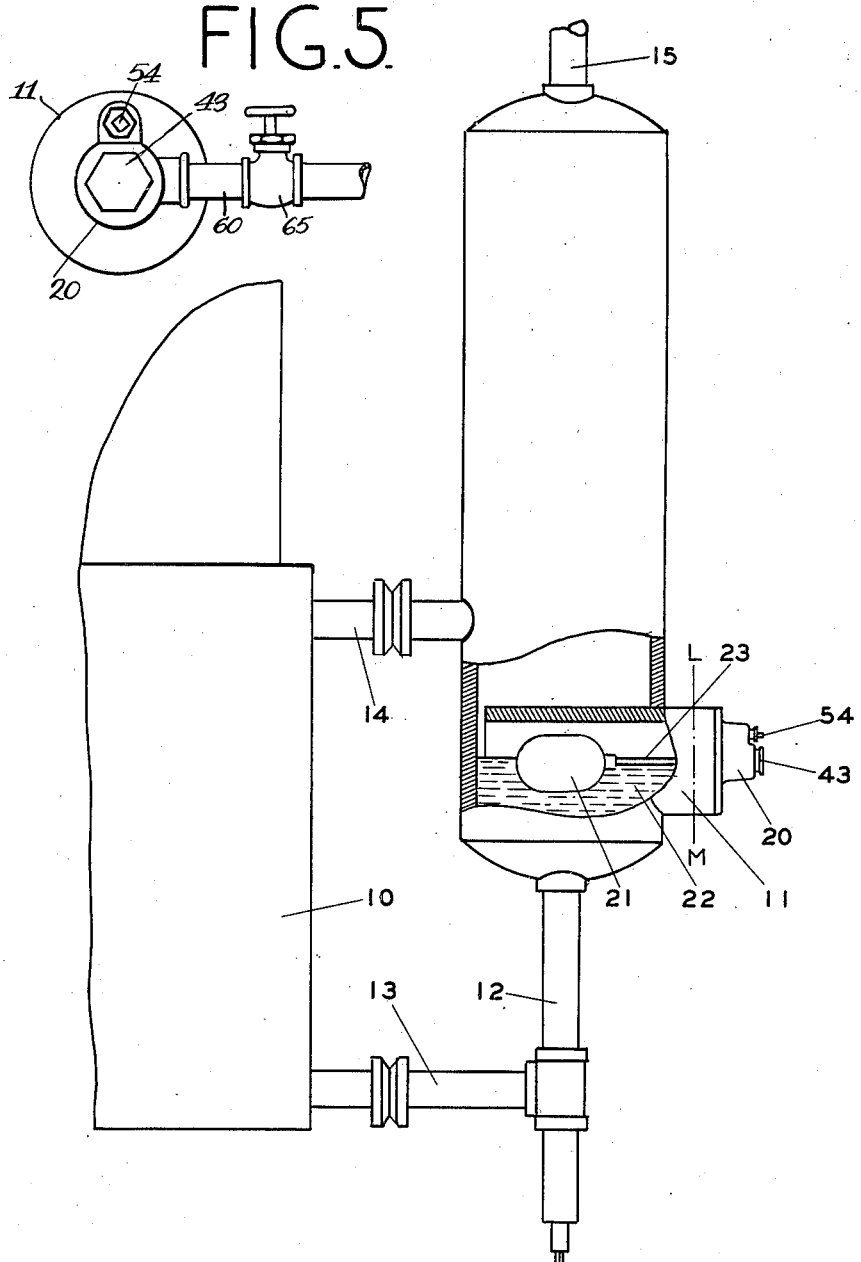
Fig. 1 is a view partly in section showing the location of the float valve in relation to one type of refrigeration equipment.

As shown in Fig. 1, reference numeral 10 designates a refrigerating unit or evaporator which may be of any type. In the operation of the evaporator, the liquid refrigerant is fed to the surge drum 11, through the valve 20. From the surge drum the liquid passes through the pipes 12 and 13 into the bottom of the evaporator where it "boils" or is gasified by the heat units picked up therein and the gas passes through the upper pipe 14, the upper part of the tank, and back through the pipe 15 to the compressors or absorbers (as the case may be).

To control the height of the liquid refrigerant in the surge drum and in the evaporator coils and secure "flooded" operation of the coils, the valve 20 is provided and forms the subject matter of this application. The valve 20 is operated by vertical movement of the float 21, which float is supported by the liquid 22 in the surge drum or tank 11. Movement of the float 21 is communicated to the valve 20 through the float rod 23.

Figure 2:
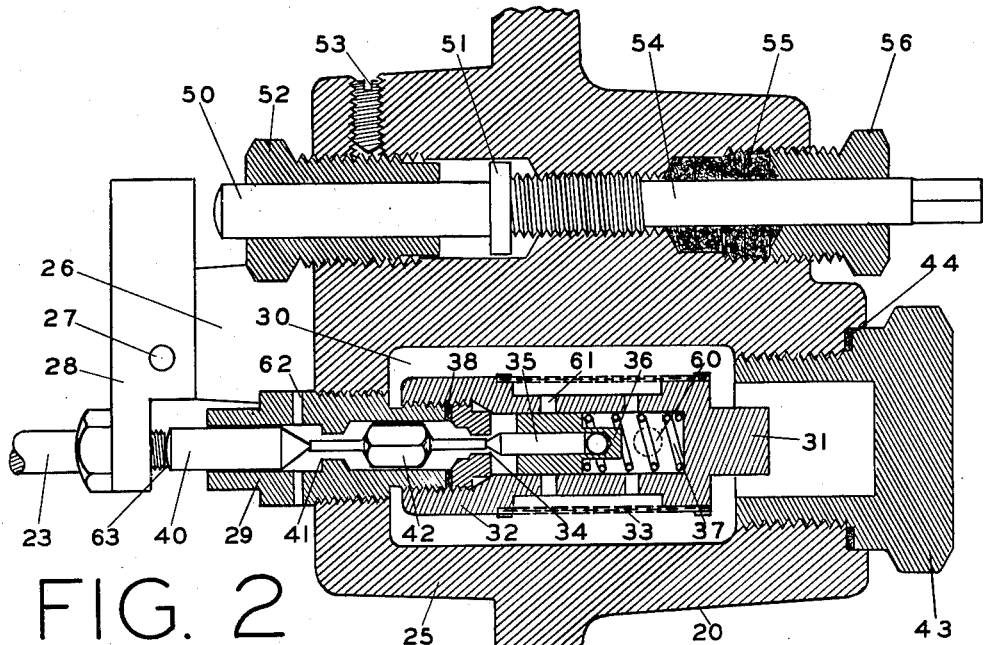
Fig. 2 is a vertical cross section of the assembled valve housing, with the operating rods and valve needles in place and not in section.

As shown in Fig. 2, the valve 20 comprises the housing 25 to which is attached the arm 26. Journalled in this arm 26 is the pin 27 supporting the float block 28. The float rod 23 is fixed to the float block 28 and the assembled float block, float rod and float revolve about the axis of the pin 27. The threaded end of the float rod 23 permits of some adjustment.

Fixed in the housing 25 is the boss 29 which projects into the chamber 30 within the valve housing. Mounted on the inner end of the boss 29 is the cartridge 31. The cartridge 31 comprises the main or operating parts of the valve and these consist of the cartridge housing, or body 32, the screen 33, the main valve seat 34, the main valve needle 35, the saddle 36 and the spring 37.

The gasket 38 between the boss 29 and the main valve seat 34 is compressed when the cartridge 31 is screwed in place upon the boss 29 and thus compels all of the liquid refrigerant to pass through the main valve.

The boss 29 contains the auxiliary valve which consists of the auxiliary valve needle 40 and the auxiliary valve seat 41. Mounted to slide within the boss 29 is the pusher piece 42 which serves to space apart the main valve needle and the auxiliary valve needle.

The access plug 43 is threaded into the valve housing 25 and makes a gas and liquid tight joint with the housing by means of the gasket 44. Upon the removal of the plug 43 the main valve cartridge 31 may be unscrewed from the boss 29 and removed in its entirety from the valve.

The auxiliary valve may be manually closed by means of the shut off mechanism which comprises the shut off piece 50 having a head 51. The piece 50 slides within the plug 52 which plug may be locked in position by means of the set screw 53. The position of the inner end of the plug 52 limits the outward movement of the piece 50 by engaging the head 51. The threaded rod 54 is used to apply pressure against the piece 50 which in turn contacts and forces outwardly the upper end of the float block 28. This movement forces the auxiliary valve needle 40 into the boss 29 until it contacts with the auxiliary valve seat 41 and causes the auxiliary valve to function as a shut off. The plug 52 is set to limit the movement of the piece 50 and prevent excessive injurious pressure being applied against the auxiliary valve seat 41.

The rod 54 is held in position by the frictional engagement of the packing 55 which may be compressed by the plug 56 to secure the desired amount of frictional resistance to turning of the rod 54.

Figure 3:
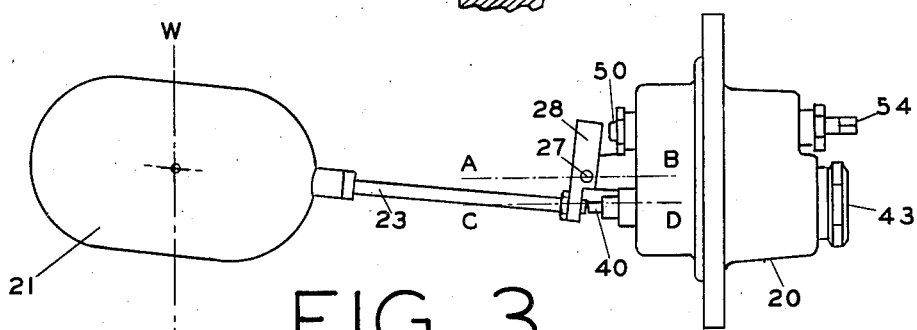
Fig. 3 is an outline view of the complete valve showing the float in upper position.
Figure 4:
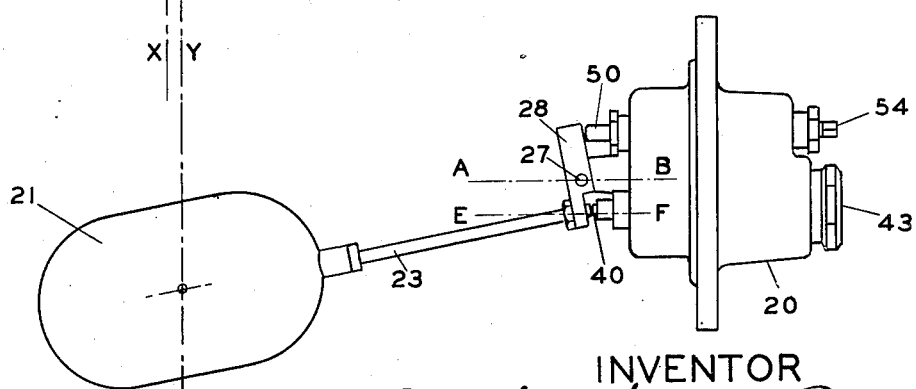
Fig. 4 is an outline view of the complete valve showing the float in lower position.

Fig. 3 shows the valve assembly with the float in its extreme upper position. In this position the main valve is closed. Fig. 4 shows the valve assembly with the float in its extreme lower position. In this position the main valve is opened and the auxiliary valve is closed. The position of the float as shown in Fig. 4 is the position assumed by the float when the shut off piece 50 has been forced outwardly by means of the rod 54 to close the auxiliary valve. If the supply of refrigerant to the evaporator is now shut off, chamber 30 will be isolated and the access plug 43 and thereafter the main valve cartridge 31 may be removed, with practically no loss of refrigerant, and without disconnecting the feed or suction lines to the evaporator.

In the operation of the valve the liquid refrigerant is fed into the chamber 30 through a suitable connection shown diagrammatically at 60. In this feed line 60 is located the main shut off valve for the evaporator, which valve is open while the evaporator is in operation. The liquid passes through the screen 33 and through the ports 61 to the inner chamber of the cartridge 31. From this point it passes through the main valve, past the pusher piece 42, through the auxiliary valve and is discharged through the ports 62. Normally, the main valve needle 35 is open just far enough to permit the passage of sufficient liquid to make up for the liquid being evaporated in the refrigerating unit. As more liquid is used and the float drops the main valve is opened farther, and as less liquid is used and the float rises the main valve closes.

When the surge tank and the evaporator coil is empty, the entire weight of the float assembly must be balanced by the valve spring and it is necessary that the valve spring be of sufficient strength to hold the auxiliary valve off its seat. The spring must also be sufficiently sensitive to give the necessary nice control of the main valve when the float is in its upper position.

The requirement of strength with sensitivity and the fact that available springs are not always uniform, either originally or after a period of use, necessitate a wide range in the spring action in order to give commercial satisfaction. The mechanism disclosed serves to broaden the range of the spring in several ways.

Referring to Fig. 3, the line AB is a line passing through the axis of the pin 27. The line AB is parallel to the direction of the force exerted by the valve spring. When the float is in its upper position as shown in Fig. 3 the point of contact between the needle 40 and the float rod 23 is near the top of the needle 40 and the line CD which is parallel to AB passes through this upper point of contact. It will be obvious that the distance between the lines AB and CD represents the length of the short arm of the leverage system involved in this upper position.

Referring to Fig. 4, the line AB is a line passing through the axis of a pin 27 and is parallel to the direction of the force exerted by the valve spring. When the float is in its lower position as shown in Fig. 4 the point of contact between the needle 40 and the float rod 23 is nearer the bottom of the needle 40 and the line EF which is parallel to AB passes through this lower point of contact. It will be obvious that the distance between the lines AB and EF represents the length of the short arm of the leverage system involved in this lower position.

The increase in the separation of the lines as described represents the increased length of the leverage arm obtained when the float is in the lower position as shown in Fig. 4. This greater length of leverage arm through which the spring force acts results in a marked increase of the available range for any given spring and is an important feature of this invention.

The end of the needle 40 may be somewhat curved as shown at 63 and the shape of this cam end on the needle will govern the change in the length of the leverage arm secured.

As shown in the drawings the pin 27 of Fig. 3 is positioned vertically above the pin 27 of Fig. 4. The line WX in Fig. 3 is a vertical line passing through the center of gravity of the float 21 and the line YZ in Fig. 4 is a vertical line passing through the center of gravity of the float 21 as shown in this figure. The distance between the lines WX and YZ represents the decrease in the length of the long arm of the leverage system involved when the float is in its lower position. This decreased length through which the mass of the float acts when unsupported by liquid reduces the pressure on the needle 40 of the auxiliary valve and thus assists the spring action to this extent.

It is pointed out that the auxiliary valve opens away from the pressure of the liquid controlled and therefore the liquid pressure will assist in opening the auxiliary valve when it is closed.

As shown in Fig. 5 the plant feed line 60, which supplies the valve 20 with liquid refrigerant, is provided with the valve 65, for the purpose of shutting off the liquid supply to the valve.

When it is desired to replace the valve cartridge 31, the valve 65 is shut off and pumping continued until the liquid line 60 and valve chamber 30 have been pumped out. The rod 54 is then screwed down until the auxiliary valve needle 40 and valve seat 41 engage, thus closing off the evaporator circuit from the chamber 30. In this manner the chamber 30 is isolated. The access plug 43 is then removed and the valve cartridge 31 withdrawn through the plug opening. A new valve cartridge may then be mounted in the chamber 30, and the plug 43 replaced. To place the evaporator in full service the auxiliary valve and the liquid feed line are opened.

I claim:

In a float valve for the control of a refrigerant, a housing and an isolated chamber therein, a threaded boss protruding into said chamber and a plug providing access to said chamber; a valve cartridge adapted to be inserted through said plug opening and engaging the end of said boss; said valve cartridge comprising a valve seat, a valve needle, and a spring to hold said needle against said seat.

HARRY A. PHILLIPS.